US010771827B2

(12) United States Patent
Van Doorn et al.

(10) Patent No.: US 10,771,827 B2
(45) Date of Patent: Sep. 8, 2020

(54) MONITORING AND ACTIVITY REPORTING OF ENHANCED MEDIA CONTENT

(75) Inventors: Jan Van Doorn, Castle Rock, CO (US); Brian Field, Evergreen, CO (US); Daniel P. Groustra, Littleton, CO (US); Mark Torluemke, Centennial, CO (US); James Hamilton Hall, Jr., Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/114,729

(22) Filed: May 24, 2011

(65) Prior Publication Data

US 2012/0304205 A1  Nov. 29, 2012

(51) Int. Cl.
*H04N 21/24* (2011.01)
*H04N 21/442* (2011.01)
(Continued)

(52) U.S. Cl.
CPC ... *H04N 21/2407* (2013.01); *H04N 21/44204* (2013.01); *H04N 21/44222* (2013.01);
(Continued)

(58) Field of Classification Search
CPC ......... H04N 21/2407; H04N 21/44204; H04N 21/812; H04N 21/5126; H04N 21/8352; H04N 21/8545; H04N 21/8126
(Continued)

(56) References Cited

U.S. PATENT DOCUMENTS 5,623,490 A * 4/1997 Richter et al. ................ 370/263
5,966,387 A * 10/1999 Cloutier ............. H04N 21/4305
370/516
(Continued)

FOREIGN PATENT DOCUMENTS

EP 2472900 A1 7/2012
WO 03/077551 A1 9/2003

OTHER PUBLICATIONS

OpenCabe Specifications ETV, "Enhanced TV Application Messaging Protocol 1.0, OC-SP-ETV-AM1.0-I04-070921," Sep. 21, 2007, pp. 1-29, Cable Television Laboratories, Inc.
(Continued)

*Primary Examiner* — Jeremy S Duffield
(74) *Attorney, Agent, or Firm* — Banner & Witcoff, Ltd.

(57) ABSTRACT

A monitoring and analysis system is disclosed that gathers and analyzes information about distributed enhanced content delivery to end user or other equipment. The system may establish communications connections along the content delivery system, filter content received from different locations of the system, and compare the received content with an expected content characteristic. Also, a radio frequency signal from the distribution network may be converted into an Internet Protocol (IP) format by a converter so that the transformed signal may be similarly analyzed as other signals from the system. A report may be consequently generated that is indicative of the received enhanced content and any detected discrepancies with respect to expected enhancement events. Identification of the enhanced content may be based on the program association table and the program map table in order to determine the packet ID of the application signals.

21 Claims, 11 Drawing Sheets (51) Int. Cl.
*H04N 21/81* (2011.01)
*H04N 21/8352* (2011.01)
*H04N 21/8545* (2011.01)
*H04N 21/658* (2011.01)
*H04N 21/475* (2011.01)

(52) U.S. Cl.
CPC ..... *H04N 21/4756* (2013.01); *H04N 21/6582* (2013.01); *H04N 21/812* (2013.01); *H04N 21/8126* (2013.01); *H04N 21/8352* (2013.01); *H04N 21/8545* (2013.01)

(58) Field of Classification Search
USPC ..................................... 725/22, 32, 36, 107
See application file for complete search history.

(56) References Cited

U.S. PATENT DOCUMENTS

| | | | | |
|---|---|---|---|---|
| 8,289,845 | B1* | 10/2012 | Baldonado et al. | 370/230 |
| 2002/0147978 | A1* | 10/2002 | Dolgonos et al. | 725/62 |
| 2005/0028195 | A1* | 2/2005 | Feinleib | H04N 21/4307 |
| | | | | 725/32 |
| 2005/0278746 | A1 | 12/2005 | Steelberg et al. | |
| 2006/0218609 | A1* | 9/2006 | Johnson et al. | 725/105 |
| 2007/0091919 | A1* | 4/2007 | Sandoval | H04N 21/235 |
| | | | | 370/466 |
| 2007/0107023 | A1* | 5/2007 | Versteeg et al. | 725/95 |
| 2007/0162927 | A1* | 7/2007 | Ramaswamy et al. | 725/36 |
| 2009/0070803 | A1* | 3/2009 | Jacobs | H04N 21/4331 |
| | | | | 725/32 |
| 2009/0228941 | A1* | 9/2009 | Russell et al. | 725/107 |
| 2009/0285106 | A1* | 11/2009 | Bernard | H04L 41/065 |
| | | | | 370/242 |
| 2011/0307921 | A1* | 12/2011 | Zenoni | 725/32 |

OTHER PUBLICATIONS

OpenCabe Specifications ETV, "Enhanced TV Binary Interchange Format Protocol 1.0, OC-SP-ETV-BIF1.0-I04-070921," Sep. 21, 2007, pp. 1-420, Cable Television Laboratories, Inc.
Extended European Search Report—EP12169271.9—dated Sep. 5, 2013.
Mar. 17, 2017—European Office Action—EP 12169271.9.
Mar. 5, 2018—Canadian Office Action—CA 2,777,343.
May 14, 2018—European Summons to Oral Proceedings—EP 12169271.9.
Mar. 28, 2019—Canadian Office Action—CA 2,777,343.
Feb. 4, 2020—Canadian Office Action—CA 2,777,343.

* cited by examiner

☐Website1  ☐Website2  ☐Website3  ☐Website4  ☐Website5  ☐Website6  ☐Website7  ☐Website8

⬇ ⬆ ↻ ⌂ ☆ (http://Yengtools04.westchester.pa.bo.comcast.net:etvcurrent.hsn.html)

ETV Activity for HSN
Current Application
Application Id: 4521985
URL:tundbergiv.com/HSN_ITV_EBIF/HSN_SBR_v1/1.6;HSN_ITV_EBIF_pr.pr
Date started Fri. 15 Jan 2010 16:54:42 gmt

Current Offering
Princess Jaipur Carnelian and Black Diamond Sterling Silver Enamel Ring
Date started: Thu. 21 Jan 2010 01:03:17 GMT

History (last 24 hours)
- Sima K 1.51ct Colors of Sapphire Rosetone Ring  ○Gem Designs by Palermo 4.14ct Quartz and Gemstone 14K "Hidden Solitare" Ring
- ct Colors of Sapphire Topaz Bezel Ring  ○Sima K 25ct Apple Quartz Cushion-Cut Ring
- Sterling Silver Checkerboard-Top Ring  ○Sima K Pink Chalcedony and Multigem Sterling Silver "Butterfly" Ring
  - ○Sima K Blue and Pink Chalcedony Sterling Silver Reversible Enhancer Pendant with 18" Chain
  - ○Sima K 1.64t Colors of Sapphire and Topaz Tonal Pendant with 18" Chain
  - ○Sima K 1.55ct Colors of Sapphire and Topaz Tonal Ring
  - ○Sima K 1.64t Colors of Sapphire and Topaz Tonal Pendant with 18" Chain
  - ○Sima K 1.55ct Colors of Sapphire and Topaz Tonal Ring
  - ○Sima K 1.64t Colors of Sapphire and Topaz Tonal Pendant with 18" Chain
- ma K 11.12ct African Amethyst 2-Tone Sterling Silver and Vermeil Ring
  and Gemstone Set of 5 Stretch Rings

| Jan.17 | Jan.18 | 23 hr |

GMT Time: 01:06:04  Highlight:
Filter:

FROM FIG. 6A

TO FIG. 6C

- 10.20ct Prasiolite and Alexandrite "Gem Nouveau" Openwork Ring with 14K Accents
- Gem Designs by Palermo .70ct Diamond and Blue Sapphire 14K White Gold Ring
- Gem Designs by Palermo 4.76ct Blue Topaz and Diamond 14K "Buckle" Ring
- Gem Designs by Palermo 4.60ct Amethyst 14K Purple Enamel Earrings
- Gem Designs by Palermo Blue Topaz and Sleeping Beauty Turquoise 14K Ring
- Gem Designs by Palermo .70ct Diamond and Blue Sapphire 14K White Gold Ring
- Gem Designs by Palermo 15.15ct Rose de France and Purple Amethyst 14K Cross Pendant
- Gem Designs by Palermo 1.20ct Orange Sapphire and Gemstone 14K "Goldfish" Ring
- Gem Designs by Palermo White Quartz Gemstone 14K "Hidden Gems" Pendant with Chain
- Gem Designs by Palermo .92ct Colors of Sapphire and Diamond 14K "Peacock" Ring
- Gem Designs by Palermo 5.90ct Multigemstone "Flower Basket" 14K Earrings
- Gem Designs by Palermo "Briolette of India" 32.25ct White Quartz and Gem 14K Pendant
- Gem Designs by Palermo 7ct Prasiolite, Chrome Diopside and Diamond 14K "Vineyard" Ring Jan.19  Jan.20  Jan.21  0 hr data period: last 137 days Clear All

MONITORING AND ACTIVITY REPORTING OF ENHANCED MEDIA CONTENT

TECHNICAL FIELD

The disclosure relates generally to gathering and analyzing information about distributed enhanced content delivery.

BACKGROUND

Content and data providers around the world are deploying more interactive applications by, for example, creating enhancements to a video stream. Enhanced television (ETV) applications may rely on embedding various types of data in the video stream, including programs, images, and triggers. ETV may support a growing variety of program applications, such as interactive advertising, game shows, news, sports events, voting applications, impulse upgrade promotions, and E-commerce applications.

As a new revenue opportunity, content and data providers are aggressively deploying new ETV applications on a variety of different content, in which a number of applications focus on enhanced advertisements. Advertising enhancements may be distributed in-band, for example, and the content provider typically has no easy way to determine whether an advertisement or an enhancement was actually delivered correctly and completely. However, in order to maintain statistics or collect revenue, the provider or operator must be able to verify that an enhanced advertisement or related data was correctly distributed to and/or displayed on end-user equipment. Traditional approaches for verification may be inefficient, non-scalable, and expensive to the provider or operator.

BRIEF SUMMARY

One embodiment of the disclosure is a data collection and analysis system that gathers and analyzes information about distributed content delivery to a receiver, where content such as enhanced content may include enhanced television (ETV) content. The data collection and analysis system may gather information at different points of the distribution system, e.g., Internet Protocol (IP) or another service provider network. If the data signal has been transformed, the transformed signal may be converted into an IP format by a converter so that the transformed signal may be similarly analyzed as the other signals.

Another embodiment of the disclosure may comprise a monitoring and analysis system for establishing communication connections along a content delivery network. The system may filter content received from different locations of the network. The received content may be compared with an expected content characteristic (e.g., scheduled delivery time) so that an indicator can be generated based on the comparison. The monitoring and analysis system may filter the content by identifying enhanced content any passing the identified content. Identification of the enhanced content may be based on the program association table and the program map table in order to determine the packet identifications (PIDs) of the application signals. The monitoring and analysis system may then generate a report that is indicative of the received enhancement content with the corresponding distribution location and any detected discrepancies with respect to expected enhancement events.

Another embodiment of the disclosure may include a monitoring and analysis system that establishes IP connections along different locations of a content distribution system. RF signals from the distribution system may be converted to an IP format and processed in a similar fashion as the other signals.

Aspects of the embodiments may be provided in a computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the embodiments may be practiced. It is to be understood that other embodiments may be utilized and structural and functional modifications may be made without departing from the scope and spirit of the present the embodiments.

Figure 1:
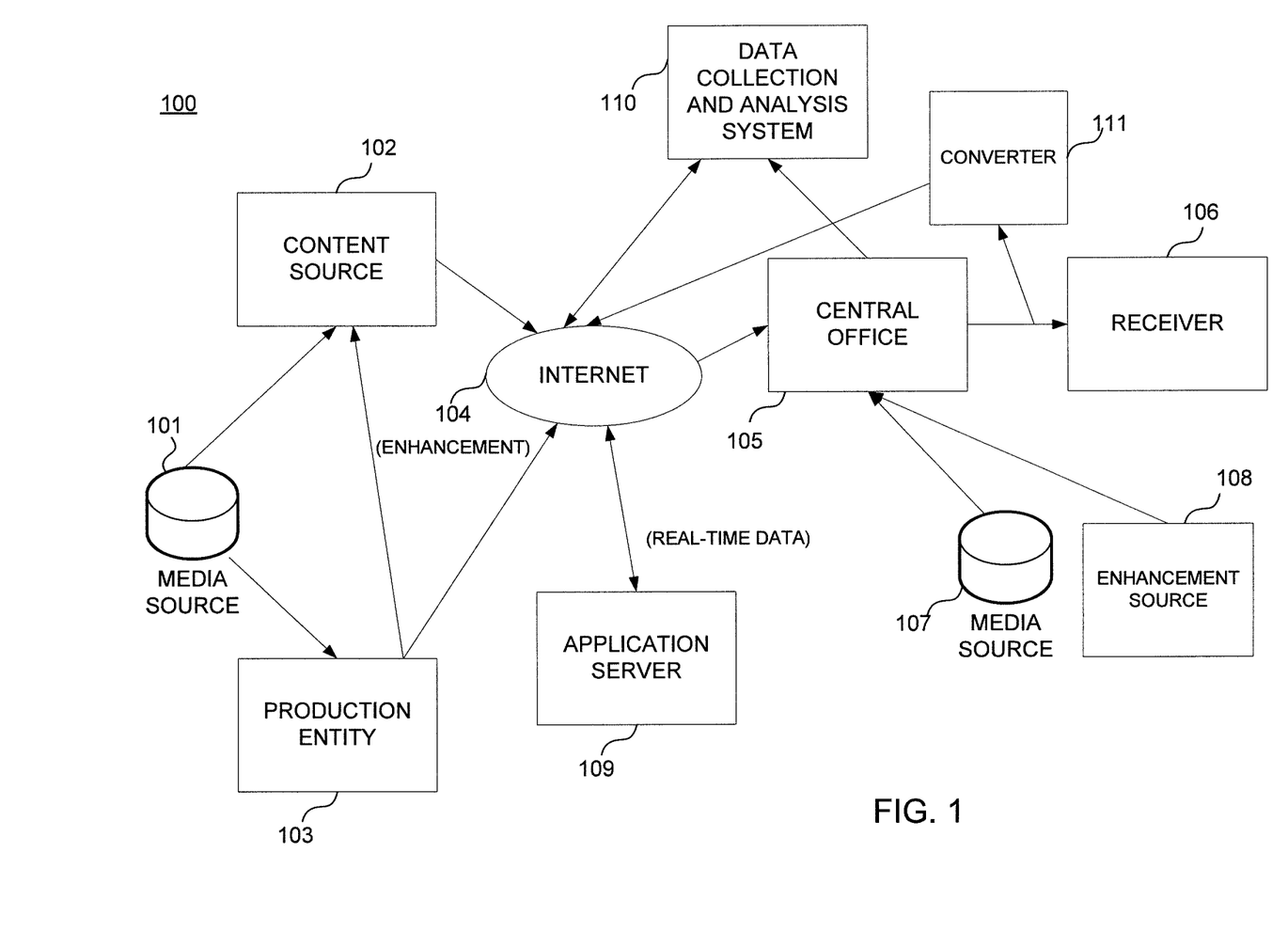
FIG. 1 shows a distribution system in accordance with some aspects of the disclosure.

FIG. 1 shows a distribution system 100, which may accommodate a distribution of enhancements, in accordance with aspects of the disclosure. An enhancement may refer to a software application that executes in conjunction with video programming, where an application (e.g., a user agent) runs on a device that decodes and executes or otherwise utilizes the enhancement. The distribution system 100 may support one or more enhancements or applications, such as program synchronous applications, interactive advertising, game shows, news, sports events, voting or survey applications, impulse upgrade promotions, recommendation applications, E-commerce applications, etc. . . . The distribution system 100 may support broadcast type distribution such as live broadcasts, distribution using switched digital video (SDV), multicast or unicast methods, distribution of pre-recorded programs, real-time viewing, time-shifted (DVR) viewing, and any other type of user interaction. Embodiments may support enhanced television viewing at receiver 106, and delivery of enhanced media may be presented to other types of receiver devices including computers and mobile telephones. Enhanced Television (ETV) may be a general term that refers to interactive services and applications provided in conjunction with video programming.

In an aspect of the disclosure, system 100 supports the creation and/or storage of enhanced applications of media source 101 through production entity 103, content source entity 102, and application server 109. Moreover, the media distribution provider may create and deploy enhancements through distribution facilities, including Internet Protocol (IP) network 104 and a provider's central office or facility (e.g., a head-end) 105.

Application production teams may generate the interactive enhancements (e.g., applications) through entity 103 in conjunction with the sources that produce the video. Applications may be built around templates for triggers and data that are inserted by a production team. Triggers often refer to a message that provides a synchronization mechanism to an enhancement and may be embedded in the associated video program, or delivered via another means such as out-of-band (OOB). Triggers may also be used for the delivery of unsolicited data with an enhancement and may include application signals and stream events. A stream event typically refers to a type of trigger that conveys application defined messages to an enhancement. For prerecorded shows, the application signaling and triggers may be mastered, for example, during the video post-production process before the show is broadcast or otherwise transmitted. An application signal may comprise a message that provides information to a receiver or another device necessary to acquire, launch, and terminate an ETV application. Throughout the production process, the production team may use a media timeline based on SMPTE time codes that are used for synchronization of a video stream. For live shows, the application signal may be prepared in advance, but the actual data to feed the application may be inserted dynamically.

Typically, enhancements are not bound to a program until after the data (e.g., video) has been digitized for final transmission. Video feeds from the major networks, for example, are often converted back to analog by a local network affiliate and then re-digitized for use by the local content transmission company, losing many enhancements along the way. Content channels may remain in the digital domain, and consequently enhancements may be inserted at the digital encoding stage. Applications and triggers may be inserted into the video stream by the broadcaster, though content source or another entity 102, using synchronization triggers and play lists that are appropriate for the type of equipment used in the transmission environment. Content providers may rely on sending those enhancements across a broadband connection to content transmission companies and affiliates who do not preserve the full digital signal from beginning to end. Some enhancements may be sent to a provider ahead of time for automatic insertion on a given schedule or a predetermined plan. Other enhancements may be transmitted in real time and synchronized to live events, either by production teams directly or via the broadcasters or the content transmission operators.

Some content providers or transmission system operators may generate their own programming and enhancements (e.g., applications) through media source 107 and enhancement source 108. The provider or operator may be responsible for obtaining the enhancement from the production entity 103 and inserting the application, signaling and triggers into the video streams, adding to or replacing video segments received over a communications media such as an IP network or satellite system. At this point, operators may be working in either the analog or digital domain, because the video may be in either state before final transmission to the user.

System 100 may include an application server 109, which may comprise a polling or score server to dynamically process user actions such as votes or quiz answers and, for example, send responses back to particular client receivers. Messages sent from the application server may require routing or insertion by the operator back into either an in-band or out-of-band data stream to a client, where the insertion is within the data stream or separate from the data stream, respectively.

Data collection and analysis system 110 gathers and analyzes information about enhanced content delivery that is distributed by system 100 to the receiver 106. System 110 typically gathers information at different points of the distribution system, e.g., at IP network 104 and at central office 105. If the media signal has been transformed (e.g., into a QAM format), the transformed signal may be converted into an IP format by converter 111. The transformed signal may be then forwarded to system 110 through IP network 104.

Figure 2:
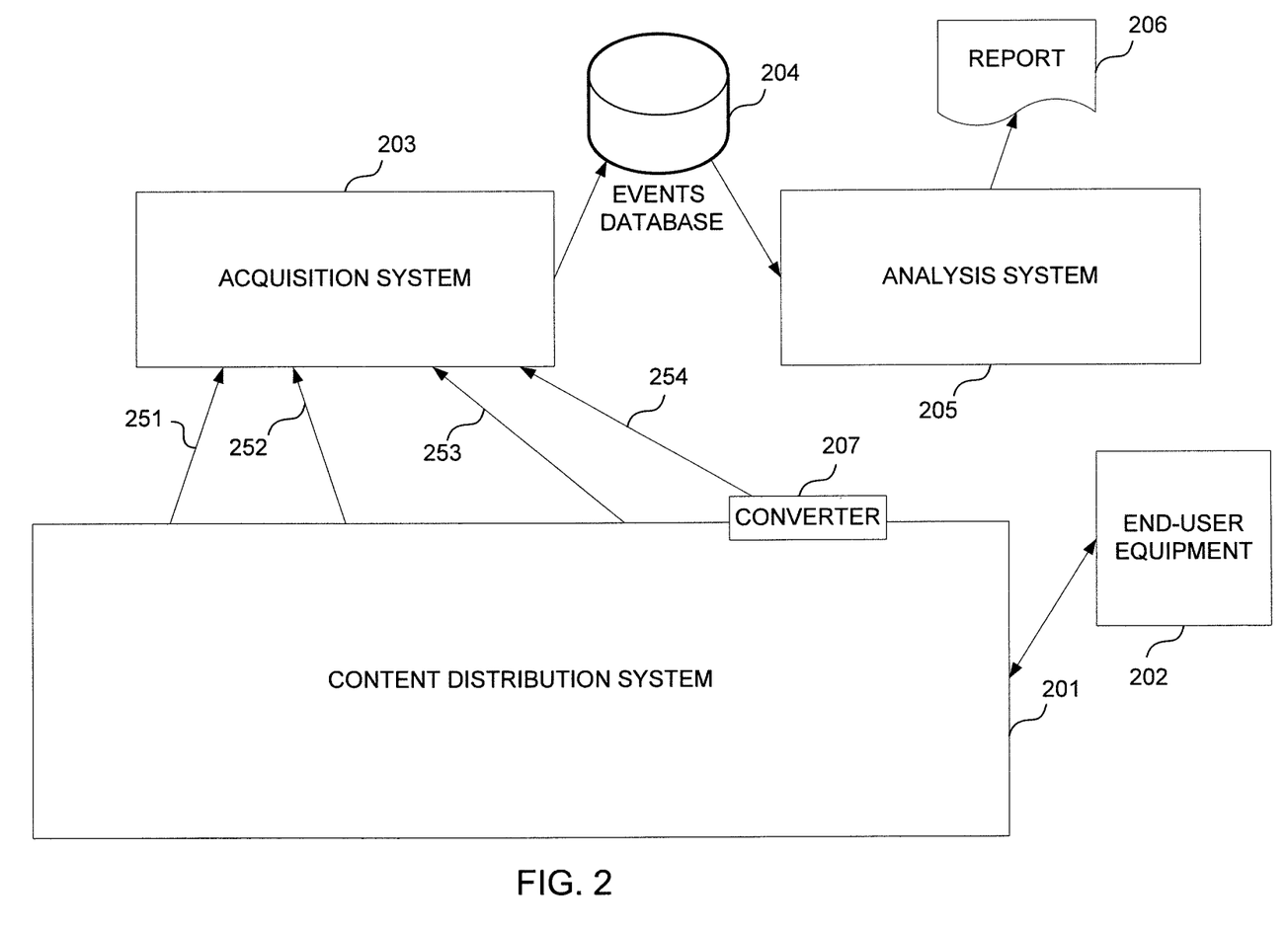
FIG. 2 shows a system that gathers and analyzes information about content delivery in accordance with some aspects of the disclosure.

FIG. 2 shows acquisition system 203 that gathers information about content delivery by content distribution system 201 in accordance with some aspects of the disclosure. Gathered information may be subsequently analyzed by analysis system 205 so that a report may be generated, as discussed below with reference to FIG. 6, for example. Components 203 and 205 may perform the functions of the analysis system 101 of FIG. 1, as well as other functions. Content distribution system 201 may correspond to IP network 104 and central office 105 as shown in FIG. 1.

While application signals may be transported upstream from end-user equipment 202 (which may correspond to receiver 106) to support interactive applications, some embodiments may gather only application signals to end-user equipment 202 to verify that scheduled application signals are delivered to end-user equipment 202 at scheduled times. For example, as a revenue opportunity, operators may be deploying new enhanced television applications on a variety of different channels, for example, the Home Shopping Network (HSN). A number of such applications often focus on enhanced advertisements. The advertising enhancements may be distributed in-band or out-of-band, and the operator or content provider may have no easy way to tell whether an enhancement was actually delivered correctly and completely through the operator's system, or run on the end user's equipment. In order to bill for the enhanced advertisement, the operator often must verify that enhanced advertisement was correctly delivered intact to and displayed by end-user equipment 202 (e.g., set-top box, display device, smart phone, etc.).

Acquisition system 203 may monitor data streams from a converged regional area network (CRAN), at the IP level over connections 251-253 or by using converter device 207, such as a QAM-IP converter, in the RF domain over IP connection 254. In some embodiments, an IP multicast group address may be used by sources along distribution system 201 and the receiver at acquisition system 203 to send and receive content. Sources may use the group address as the IP destination address in data packets to inform the multicast group whether they are interested in receiving packets sent to that group. System 203 may gather information at different points along distribution system 201 to capture enhancement events by extracting and decoding relevant enhanced signaling, and the corresponding captured data may be stored in event database 204. It may be beneficial to gather information at different points to detect any changes or acknowledgements at different points along the network or distribution system.

Analysis system 205 then can process the captured data from events database 204 to verify integrity and, for example, to create report 206. Report 206 may assume any usable or desired format including Extensible Markup Language (XML) or HyperText Markup Language (HTML) and may represent a timeline of the enhancement events. Analysis system 205 can then compare the actual enhancement events against the expected enhancement events (for example, when the enhancement information is scheduled to be displayed at an end-user's display device) and report any detected discrepancies. However, with some embodiments, a real time analysis and alerting system (not explicitly shown) may be located between systems 203 and 204.

Acquisition system 203 may monitor the enhancement or application in a signal or stream throughout its propagation through distribution network 201, as discussed below with reference to FIG. 3, for example. In order to verify that the application signal was actually delivered to end user equipment 202, the application signal may be converted from a RF domain to an IP domain by converter 207 (e.g., Silicon-Dust HDHomeRun Digital TV tuner).

Figure 3:
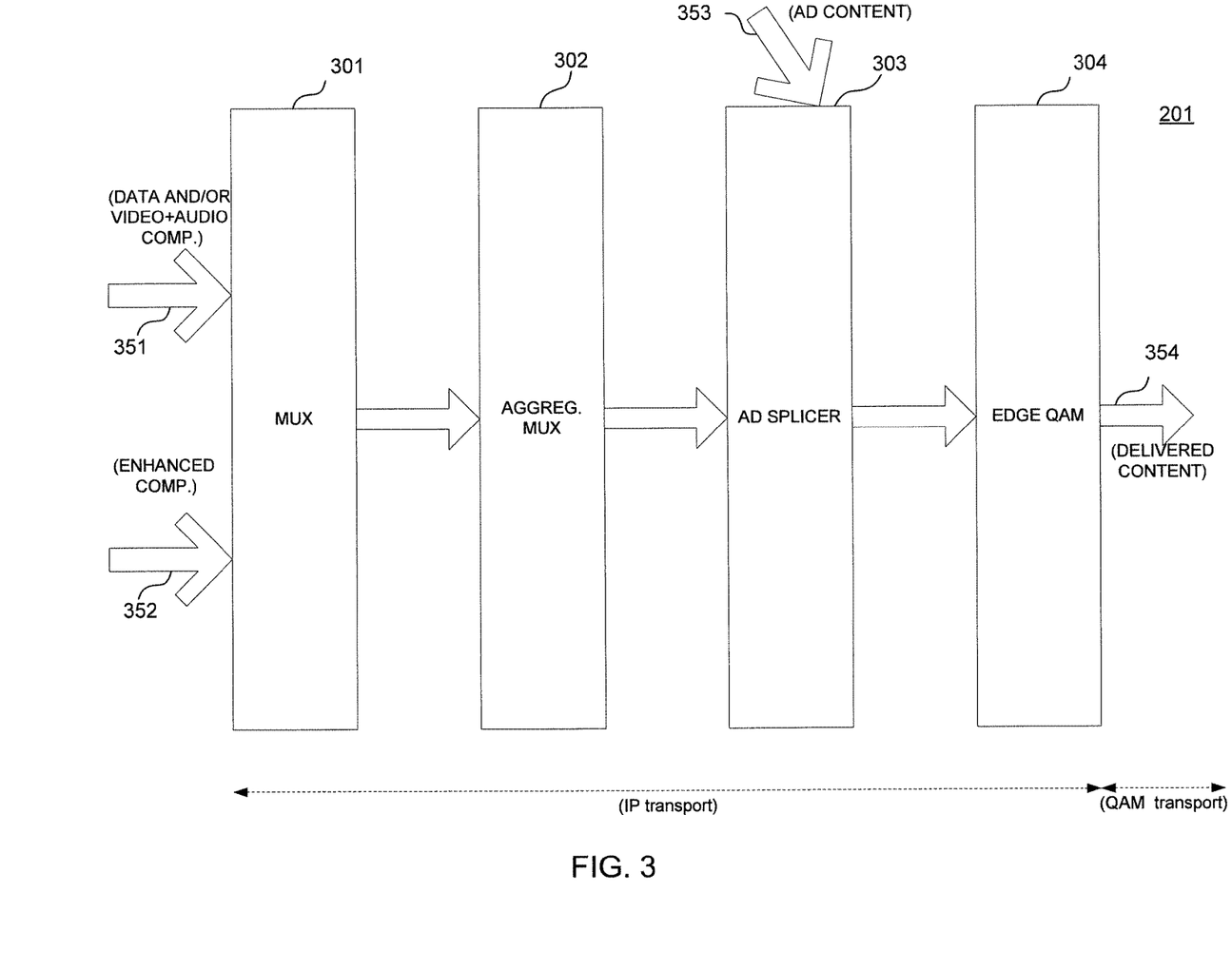
FIG. 3 shows a distribution system delivering content to end users in accordance with some aspects of the disclosure.

FIG. 3 shows an example of a distribution system 201 delivering enhanced content to end users in accordance with some aspects of the disclosure. Multiplexer 301 (typically residing at a central transmission facility) combines basic programming content components 351 with enhanced content components 352. For example, content components 351 may include video and audio or other data content components and enhanced content components 352 may include, for example, an ETV Integrated Signaling Stream (EISS) (e.g., comprising an MPEG (Moving Picture Experts Group) elementary stream that carries media timeline messages, stream events and EISS tables for an ETV application) and/or a DSM-CC Data Carousel (e.g., comprising ETV application and resource data). A statistical multiplexer may further combine content components at the regional level (city basis, e.g., Denver). The statistical multiplexer (e.g., aggregation multiplexer 302) is typically a content aggregating device that allows a provider to provide the greatest number of services for a given bandwidth by sharing a pool of fixed bandwidth among multiple services or streams of varying bitrates. The statistical multiplexer may allocate to each service the bandwidth required for its real-time needs so that services with complex scenes receive more bandwidth than services with less complex ones.

Figure 4:
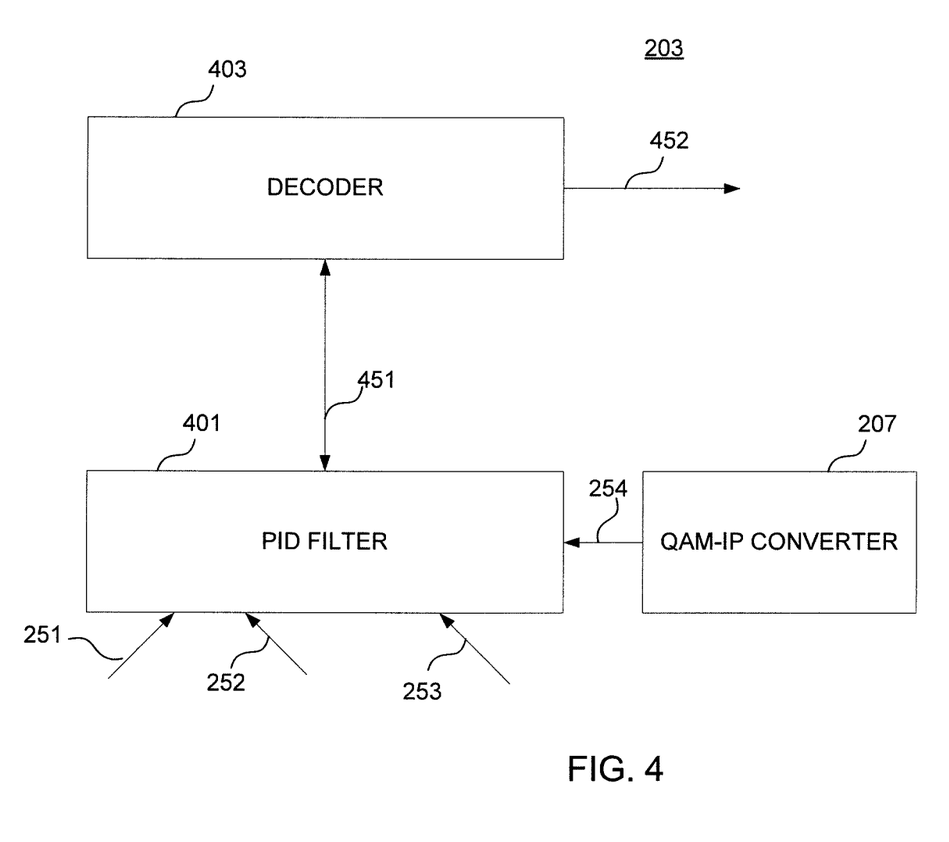
FIG. 4 shows a system that monitors a content distribution system in accordance with some aspects of the disclosure.

Advertisement content 353 may be added on a zone-basis (e.g., a city or region) that is specific to the zone by ad splicer 303. Advertisement content 353 may or may not include enhancement content components. In some aspects of the disclosure, edge QAM unit 304 converts signals over the IP transport to signals over a RF transport (e.g., quadrature amplitude modulation) in order to deliver content 354 to end user equipment 202. Referring to FIG. 4, processing by decoder 403 of content (e.g., advertisement content 353) for IP multicast (mcast) data and for QAM data may use a similar approach.

While FIG. 3 shows an embodiment of an end-to-end transmission system for delivering enhanced content for an ETV application, some aspects may support monitoring and/or tracking interactive/enhanced content (e.g., advertisements and applications) in different delivery environments. For example, monitoring or tracking may occur while surfing the Internet or at any time when receiving video/audio/data content. Monitoring and tracking may span different physical or logical entities within the delivery environment as may be identified by different pre-determined location identification values.

FIG. 4 shows an example acquisition system 203 that monitors a content distribution system in accordance with some aspects of the disclosure. Acquisition system 203 detects enhanced data streams and data within such streams (e.g., corresponding to enhanced channels or streams containing enhanced content), for example, by reading a program association table (PAT) and/or program map table (PMT). The program association table in this example can be an entry point for the program specific information (PSI) tables. The PAT is typically carried in packets with PID (packet ID)=0. For each assigned program number, the PAT may list the PID for packets containing that program's PMT. The PMT may list all the PIDs for packets containing elements of a particular program (audio, video, aux data, and enhancement data). PID filter 401 then filters signals received over IP connections 251-254 (as shown in FIG. 2 for example) and forwards packet IDs (PIDs) over communication link 451 to decoder 403 to perform analysis of the filtered content. Filter 401 may selectively pass application signals associated with enhancement data, such as data based on PID values from the PMT for enhancement content for the particular program. For example, ETV PID filter 401 then filters application signals received over IP connections 251-254 (as shown in FIG. 2) and forwards interesting packet IDs (PIDs) (e.g., tagged by 0xa1 and 0xa2 in the PMT, as well as the PAT and PMT themselves) over communication link 451 to decoder 403 to perform analysis of the filtered content. The tags may function as indicators in the PMT that a particular MPEG program is an ETV enhanced program.

Figure 5:
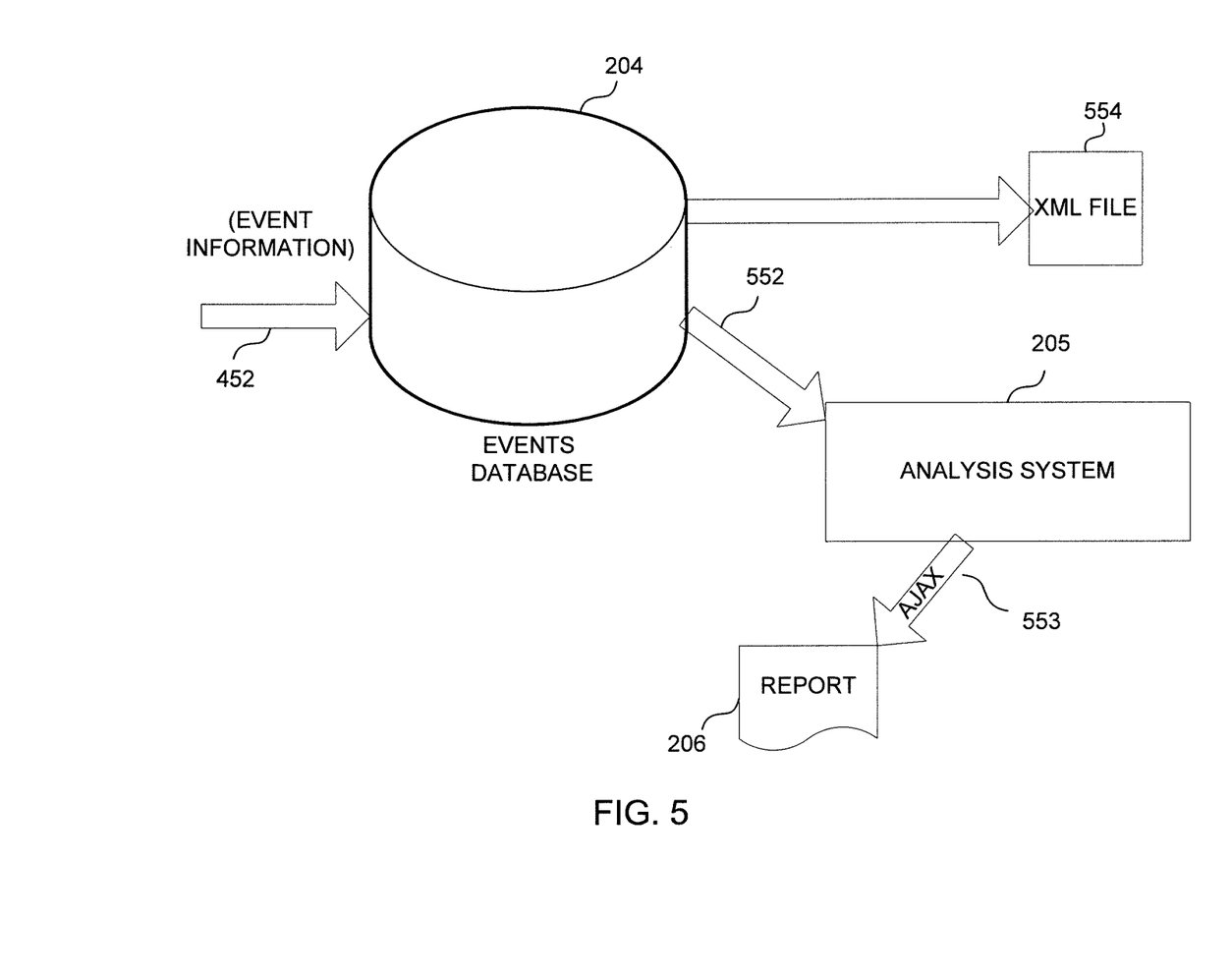
FIG. 5 shows a system that analyzes delivery of content by a distribution system in accordance with some aspects of the disclosure.

Decoder 403 may read packets with a PID value corresponding to ETV Integrated Signaling Stream (EISS), for example, to identify enhancement events that are detected along distribution system 201. Decoder 403 may extract and decode the ETV signaling and data activity, and verify integrity of the delivery of enhancements. Each identified enhancement event may be characterized by a start time, a stop time, and event details, e.g., application ID and organization ID as signaled in the EISS. Decoder 403 may then read packets with a resource data PID in order to load files from the data carousel (where data may be transmitted repeatedly in a standard format) and to identify corresponding enhancement sub-events based on a start time, a stop time, and enhancement sub-event details. (As will be further discussed, a sub-event is a change of the signaling of the enhancement while the enhancement stays active.) Also, location identification may be added to the event information based on the source of the decoded event information as provided to events database 204 (as shown in FIG. 5) over communication link 452.

An enhancement event may be a period of time during which an EISS message appears with a certain application identification (e.g., orgid/appid) with a minimal interval of x seconds. A single enhancement event may have one or more EISSs associated with it and one or more data carousels. An EISS and a data carousel may be repeated many times in normal scenarios.

An enhancement event is typically the actual enhancement, and an enhancement sub-event is a change of the signaling of the enhancement while the enhancement stays active. For example, the Home Shopping Network (HSN) may generate the same enhancement event, but different product offerings may be identified by different files on the carousel. The different carousel configurations may correspond to different enhancement sub-events.

The following are examples monitoring and/or tracking of knowing about enhancement events as may be supported by some of the embodiments. For example, an enhancement event may occur over a period of time in which an EISS message is detected with a specific application identification. A single enhancement event may be associated with one or more EISSs and one or more data carousels. An EISS and a data carousel may be repeated many times. As previously discussed in reference to FIG. 3, EISS messages and data carousels may be carried in enhanced content components 352. Once acquisition system 203 (as shown in FIG. 2) knows or learns about an enhancement event, acquisition system 203 may store event information in events database 204.

Example 1

Enhancement Event

A Ford ad enhancement (application ID 121432) runs from 11:30:00 AM to 11:30:30 AM on BET in adzone ID 3012. A software entity (e.g., an agent) in the ETV Activity Reporting System typically knows what agent_id it is, and what transport_id it is on from its startup parameters and a database query on startup.
The agent may perform:
  Entering a new event row into the database when the EISS AUTOSTART is seen with a null end_time
  Entering a new eiss row into the database when the EISS AUTOSTART is seen with a null end_time
  Entering a new data_carousel row into the database when the DownloadInfoIndication (DII) on the data carousel is seen and
  Reading the files from the carousel,
  Performing md5 checksum
  Checking if md5sum already exists in DB
  Loading file into DB if it didn't already exist
  Creating a carousel_to_file entry that links the file(s) to the carousel
  Updating the end_time in the previously mentioned eiss row when the EISS DESTROY is seen
  Entering a new row in the eiss table into the database with the DESTROY info
  Updating the end_time in the eiss row and in the event row when the EISS DESTROY is not seen for x seconds
In this example, at least one entry is created in the event, data_carousel and carousel_to_file tables, and two entries in the eiss table.

Example 2

Enhancement Event

Another example of an enhancement event is associated with a Home Shopping Network application. An agent typically knows what agent_id it is, and what transport_id it is on from its startup parameters and a database query on startup. The agent may perform:
  Entering a new event row into the database when the EISS AUTOSTART is seen with a null end_time
  Entering a new eiss row into the database when the EISS AUTOSTART is seen with a null end_time
  (1) Entering a new data_carousel row into the database when the first DII on the datacarousel is seen and
  Reading the files from the carousel,
  Performing md5 checksum
  Checking if md5sum already exists in DB
  Loading file into DB if it didn't already exist
  Creating a carousel_to_file entry that links the file(s) to the carousel
  Updating the end_time in the previously mentioned data_carousel row when a new version of the DII is seen
  goto (1)
With this example, the event may never end, but there may be many different carousel, carousel_to_file, and file_data entries for this single event. However, the event may be artificially terminated at an off hour and may be later restarted.

Example 3

Enhancement Event

This example may be for a CNN application. An agent typically knows what agent_id it is, and what transport_id it is on from its startup parameters and a database query on startup. The agent may perform:
  (1) Entering a new event row into the database when the EISS AUTOSTART is seen with a null end_time
  Entering a new eiss row into the database when the EISS AUTOSTART is seen with a null end_time
  (2) Entering a new data_carousel row into the database when the first DII on the data carousel is seen and
  Reading the files from the carousel,
  Performing md5 checksum
  Checking if md5sum already exists in DB
  Loading file into DB if it didn't already exist
  Creating a carousel_to_file entry that links the file(s) to the carousel
  Updating the end_time in the previously mentioned data_carousel row when a new version of the DII is seen
  goto (2), or goto (1) when a EISS DESTROY or PRESENT is seen
With this example, the CNN application may be seen as events that are tucked in between the commercials.

FIG. 5 shows an example system that analyzes delivery of content by a distribution system (e.g., distribution system 201) in accordance with some aspects of the disclosure. While the delivered content may be enhancement content that is associated with an enhancement event, some aspects may analyze the delivery of different types of content such as data, video, and/or audio content. As previously discussed, decoder 403 may store enhancement event data in events database 204 based on information received from different points (such as multiplexer 301, aggregation multiplexer 302, ad splicer 303, and edge QAM unit 304, as shown in FIG. 3, and which may be identified by a location ID) along distribution system 201. Decoder 403 may generate ETV event data, in accordance with Java database connectivity (JDBC) API, for example, so that the event data may be stored by events database 204, which may comprise a relational database, e.g., Structured Query Language (SQL). Event data is typically represented with an event schema that may be compared to other data sources by analysis system 205, which may be a web server. Events database 204 may support different formats. For example, events may be represented in XML as exemplified by an enhancement event being represented as:

```
<data>
<event start="Dec 13, 2009 8:00:02 PM" end="Dec 13, 2009 8:01:03 PM"
title="Thermolontrade; Rocks by GreenPantrade; PROFESSIONAL
SERIES 11 Grill Pan">
Thermolontrade; Rocks by GreenPantrade; PROFESSIONAL SERIES 11
Grill Pan
457-502
457502
$62.95
1 payment of $62.95
3 payments of $21.95
</event>
...
</data>
```

Figure 6A:
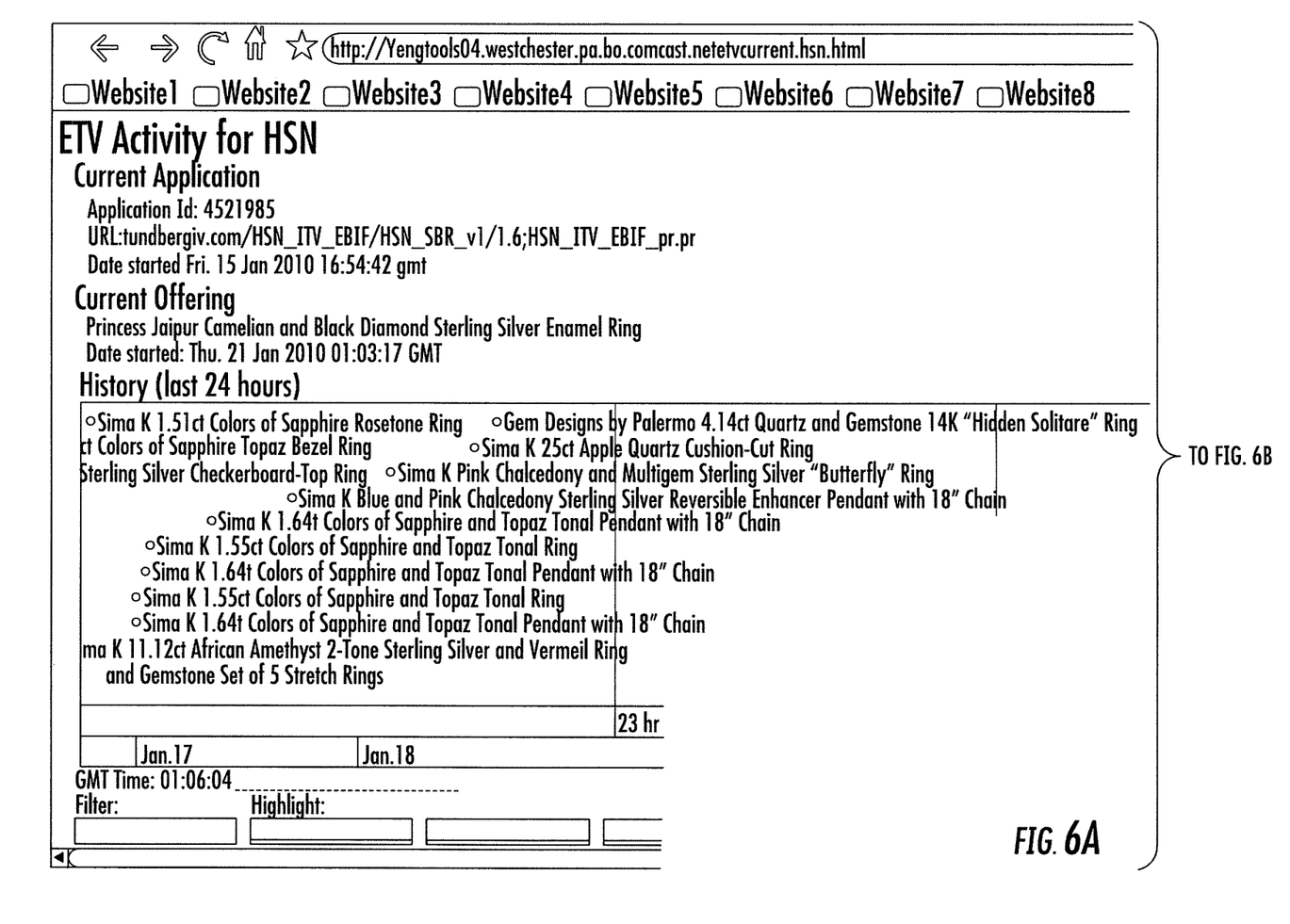
FIG. 6 shows an exemplary report document in accordance with some aspects of the disclosure.
Figure 6B:
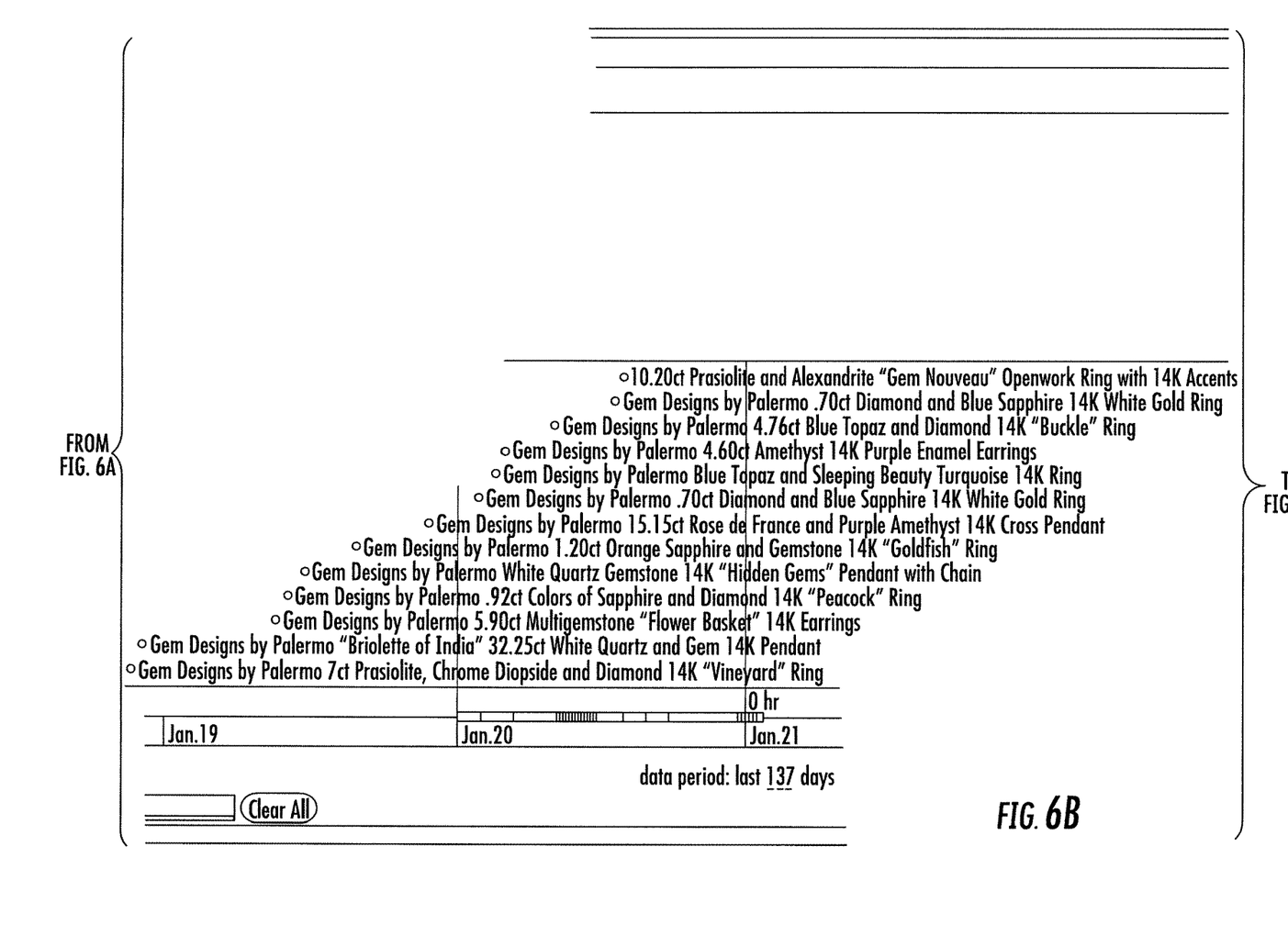
Figure 6C:
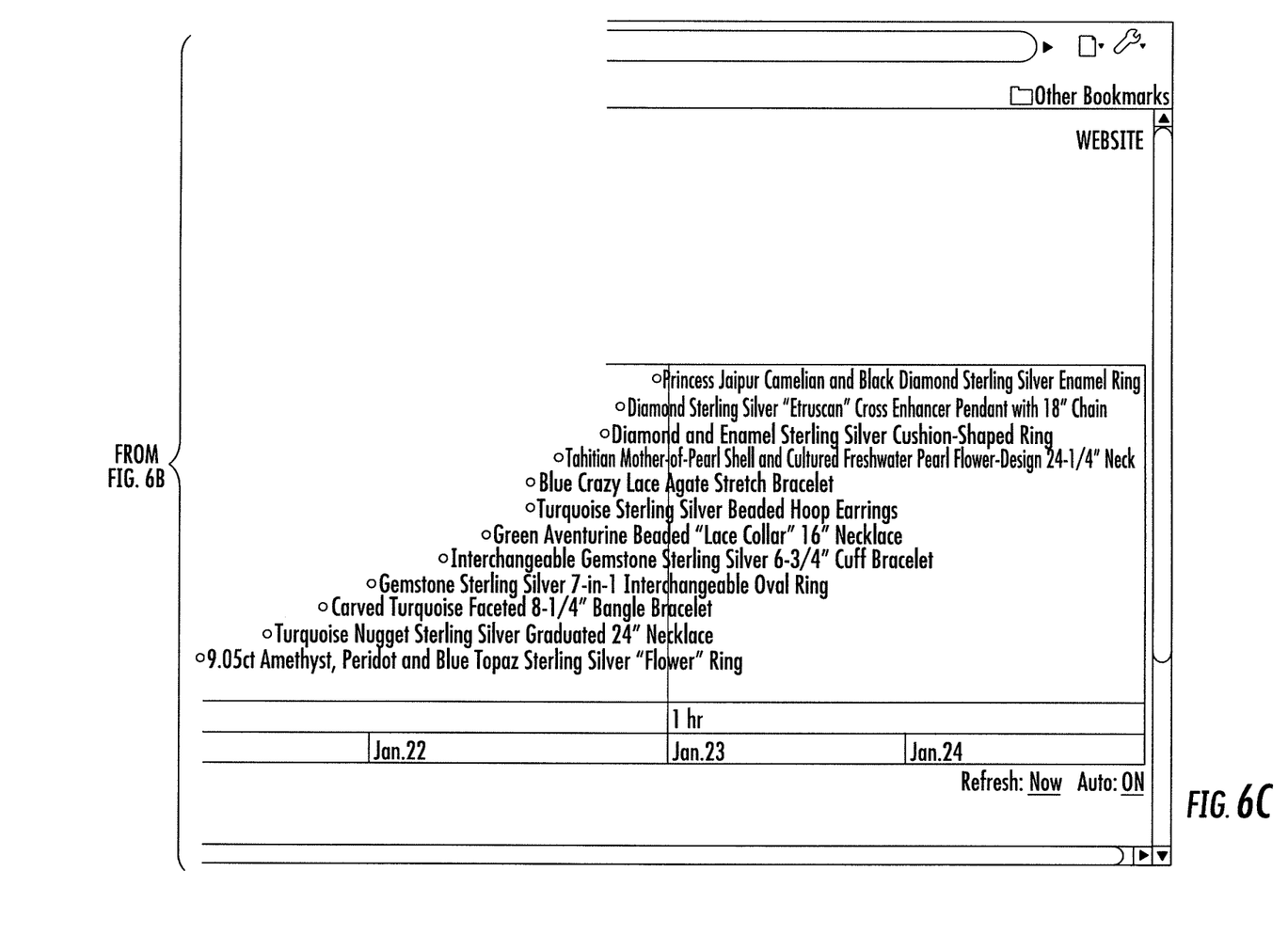

The above XML file may be compared and displayed by analysis system 205, for example using for instance the timeline widget from the Simile project as shown in FIG. 6.

Event data from database 204 may be exported to a requesting system (not explicitly shown) or may be accessed by analysis system 205 (which may be implemented as a web server) through connection 552 in order to compare the captured enhancement information with expected enhancement events. For example, system 204 may export events data as XML file 554.

Analysis system 205 may further track the captured enhancement events along distribution system 201 in order to detect possible changes or problems with any entities of distribution system 201. For example, a possible problem may be detected when an enhancement event is captured for multiplexer 301 but not for aggregation multiplexer 302, or if a program shows the ETV signature in the PMT in one location in the network but not in another. Analysis system 205 subsequently may generate report 206 that is indicative of the captured enhanced data and discrepancies between the identified enhancement events and the scheduled (expected) enhancement events through connection 553. For example, analysis system 205 may utilize Ajax (asynchronous JavaScript and XML). With Ajax, web applications may be able to retrieve data from the server asynchronously in the background without interfering with the display and behavior of the existing page.

Report 206 may be displayed on a web browser in HTML that displays a timeline of events based on the enhancement information.

Figure 7:
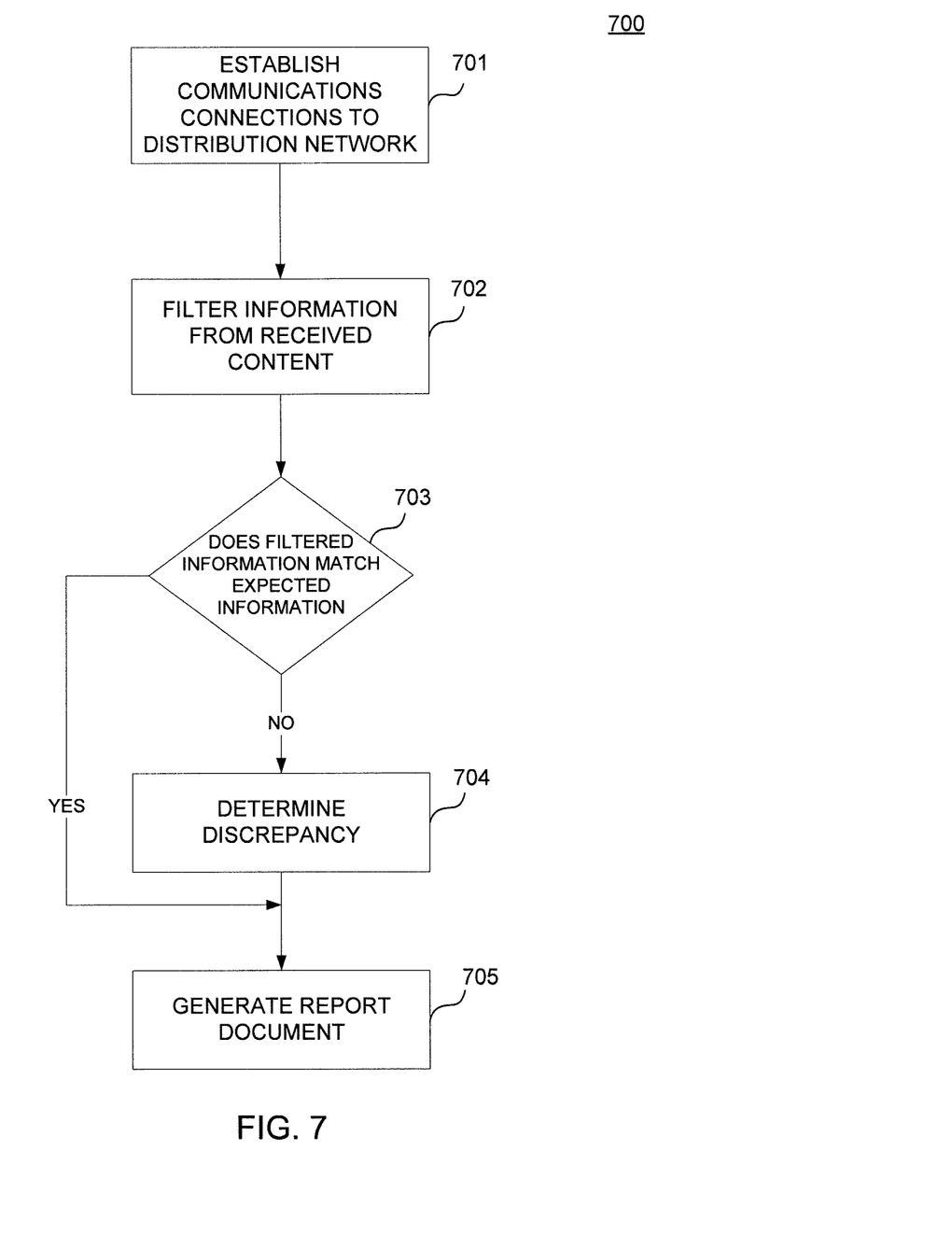
FIG. 7 shows a flow diagram for monitoring and analyzing content delivery in accordance with some aspects of the disclosure.

FIG. 7 shows an example flow diagram 700 for monitoring and analyzing content delivery by a distribution system as may be performed by acquisition system 203 and analysis system 205 in accordance with some aspects of the disclosure. Acquisition system 203 establishes communications over IP connections 251-254 (or other type of connections) to desired points along distribution system 201 at step 701. At step 702, system 203 then filters data streams received over connections 251-254 based on PIDs associated with enhancement data that is to be monitored by acquisition system 203 and to be analyzed by analysis system 205.

Analysis system 205 compares the filtered enhancement data with the expected data at step 703. The expected data may be obtained from the scheduled transmission of enhancements (e.g., an enhanced advertisement). Analysis system 205 then determines any discrepancies between the captured enhancement information and the expected information at step 704 and generates report 206 at step 705.

Figure 8:
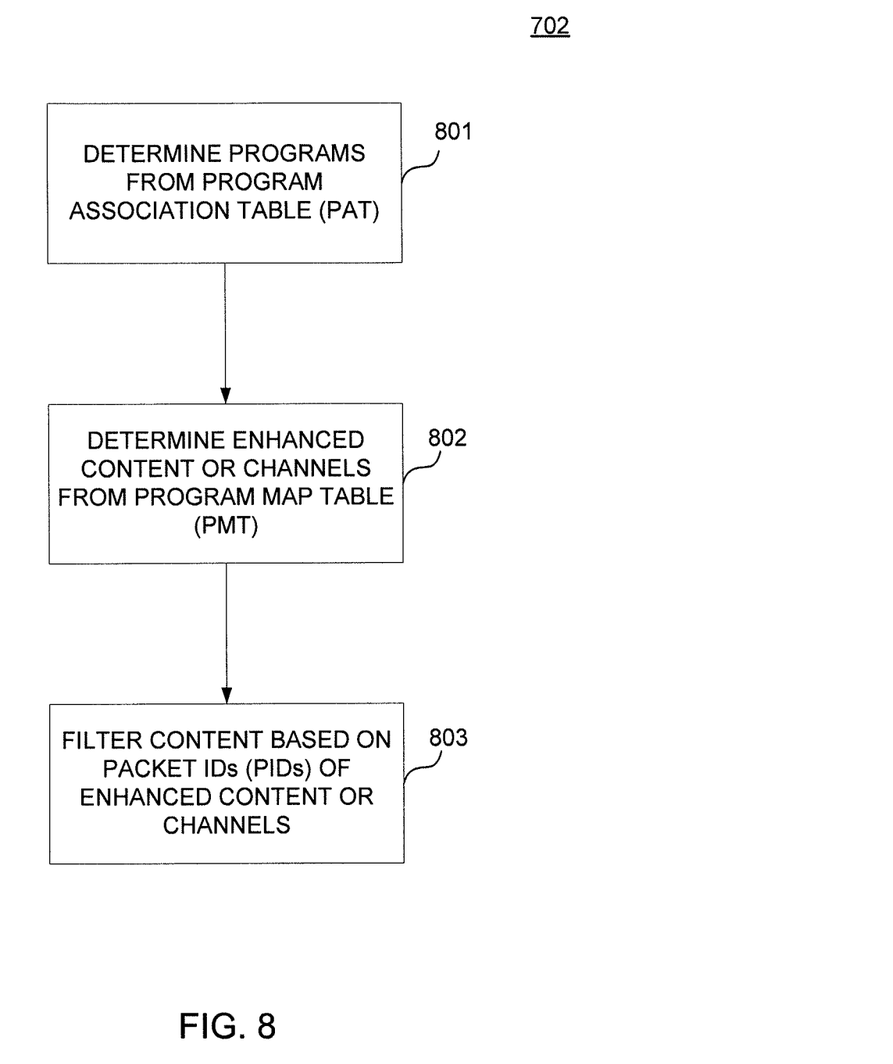
FIG. 8 shows a flow diagram for filtering channel content in accordance with some aspects of the disclosure.

FIG. 8 shows an example flow diagram 702 for filtering enhanced content in accordance with some aspects of the disclosure. At step 801 acquisition system 203 identifies enhanced channels by processing the program association table (typically with PID=0) to obtain the PID for containing the program map table for a specific program. At step 802, acquisition system 203 then identifies the PIDs for packets containing elements of the specific program (audio, video, aux data, and enhancement data) so that ETV PID filter 401 can filter application signals received over IP connections 251-254 at step 803.

Figure 9:
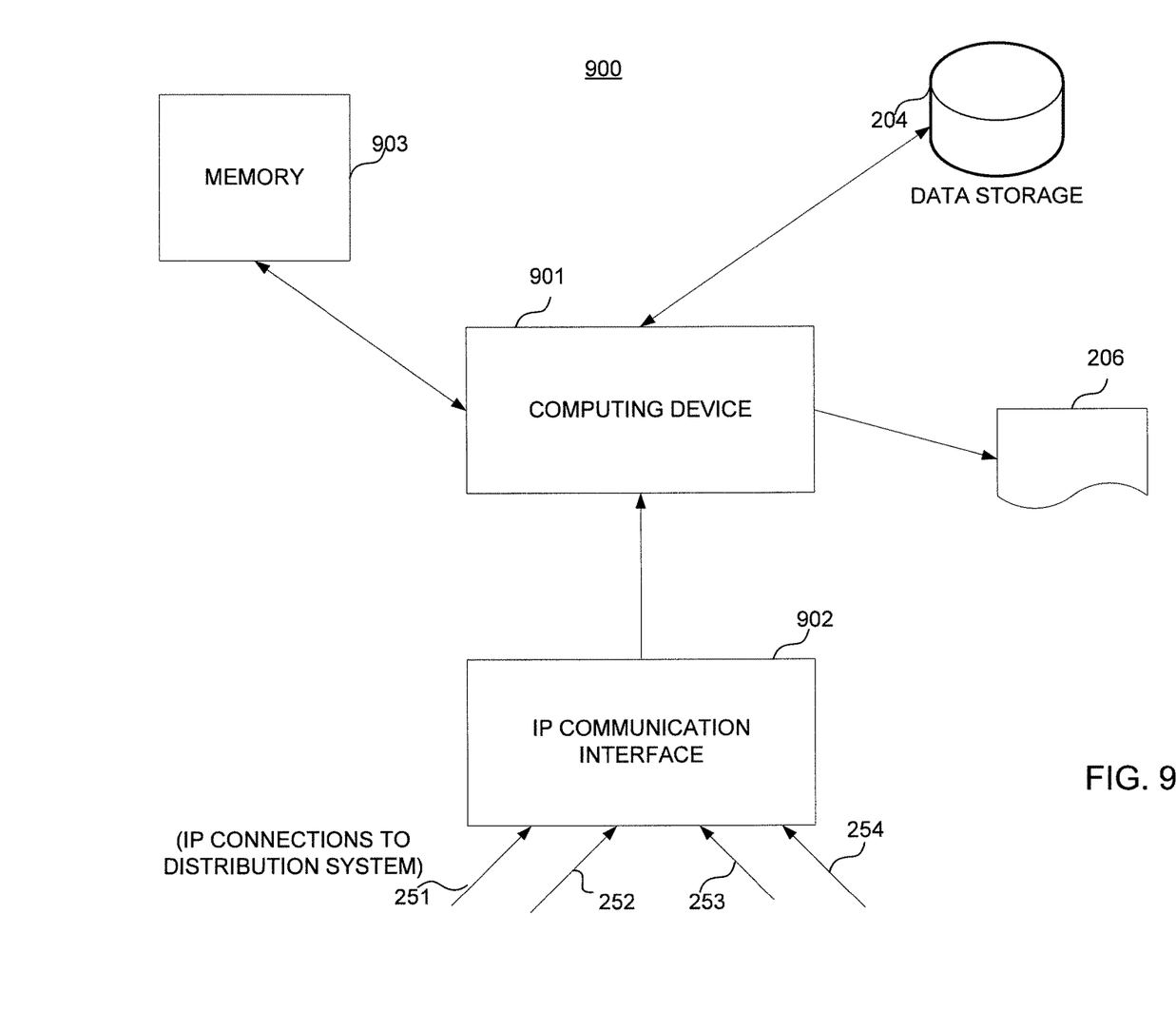
FIG. 9 shows a monitoring and analyzing system in accordance with some aspects of the disclosure.

FIG. 9 shows an example monitoring and analyzing apparatus 900 in accordance with some aspects of the disclosure.

The computing system apparatus 900 may include a computing device 901 wherein the processes discussed herein may be implemented. Computing device 901 may have a processor for controlling overall operation of the computing device 901 and its associated components, including memory 903 (that may include RAM and/or ROM) and a communication interface 902 such as an IP protocol communication interface.

Computing device 901 typically includes a variety of computer readable media. Computer readable media may include volatile and nonvolatile, removable and non-removable media implemented in any method or technology for storage of information such as computer readable instructions, data structures, program modules or other data. For example, computing device 901 may store and access enhancement data to/from data storage 204. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 901.

Computing device may create report 206, as previously discussed, through a display device (not explicitly shown), communication interface to another system (not explicitly shown), through a printing device (not explicitly shown), and the like.

Embodiments may be operational with numerous other general purpose or special purpose computing system environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

Although some devices and/or components may be shown separately, the devices and/or components may be combined in different ways. Conversely, while some devices and/or components may be shown in combination, the device/components may be separated in different ways.

What is claimed is:

1. A method comprising:
causing, by one or more computing devices, establishment of connections with a plurality of devices in a content delivery network, wherein each of the plurality of devices is associated with a different distribution portion of the content delivery network;
receiving, from the plurality of devices and via the content delivery network, first event data indicating start times of an enhancement event associated with enhanced media content delivered via the content delivery network;
receiving, from the plurality of devices and via the content delivery network, second event data indicating end times of the enhancement event;
determining, by the one or more computing devices, based on a comparison of each of the start times to a scheduled start time associated with the enhancement event, and based on a comparison of each of the end times to a scheduled end time associated with the enhancement event, one or more discrepancies in delivery of the enhanced media content via the content delivery network; and
generating, by the one or more computing devices, a report indicating the one or more discrepancies and indicating at least one device, of the plurality of devices, as a cause of the one or more discrepancies.

2. The method of claim 1, further comprising:
converting the enhanced media content from a quadrature amplitude modulation (QAM) format to a format for transmission over an Internet Protocol (IP) network.

3. The method of claim 1, further comprising:
generating an indicator that is indicative of whether a time of reception of the first enhanced media content is in accordance with the enhancement event.

4. The method of claim 1, wherein the causing the establishment of the connections comprises causing joining of an Internet Protocol (IP) multicast group.

5. The method of claim 1, further comprising:
obtaining packet IDs (PIDs) for the enhanced media content; and
receiving the enhanced media content based on the PIDs.

6. An apparatus comprising:
one or more processors; and
memory storing instructions that, when executed by the one or more processors, cause the apparatus to:
cause establishment of connections with a plurality of devices in a content delivery network, wherein each of the plurality of devices is associated with a different distribution portion of the content delivery network;
receive, from the plurality of devices and via the content delivery network, first event data indicating start times of an enhancement event associated with enhanced media content delivered via the content delivery network;
receive, from the plurality of devices and via the content delivery network, second event data indicating end times of the enhancement event;
determine, based on a comparison of each of the start times to a scheduled start time associated with the enhancement event, and based on a comparison of each of the end times to a scheduled end time associated with the enhancement event, one or more discrepancies in delivery of the enhanced media content via the content delivery network; and
generate a report indicating the one or more discrepancies and indicating at least one device, of the plurality of devices, as a cause of the one or more discrepancies.

7. The apparatus of claim 6, wherein the instructions, when executed by the one or more processors, further cause the apparatus to:
convert the enhanced media content from a quadrature amplitude modulation (QAM) format to a format for transmission over an Internet Protocol (IP) network.

8. A method comprising:
establishing, by one or more computing devices, connections with a plurality of devices, wherein each of the plurality of devices is associated with a different distribution portion of a content delivery network;
receiving, from the plurality of devices and via the content delivery network, first event data indicating start times of an enhancement event associated with enhanced media content delivered via the content delivery network;
receiving, from the plurality of devices and via the content delivery network, second event data indicating end times of the enhancement event;
determining, by the one or more computing devices, based on a comparison of each of the start times to a scheduled start time associated with the enhancement event, and based on a comparison of each of the end times to a scheduled end time associated with the enhancement event, one or more discrepancies in delivery of the enhanced media content via the content delivery network; and
generating, by the one or more computing devices, a report indicating the one or more discrepancies and indicating a corresponding distribution portion of at least one device, of the plurality of devices, as a cause of the one or more discrepancies.

9. The method of claim 1, wherein the plurality of devices comprise one or more of a user device or an edge modulation device.

10. The apparatus of claim 6, wherein the plurality of devices comprise one or more of a user device or an edge modulation device.

11. The method of claim 9, wherein the plurality of devices comprise one or more of a user device or an edge modulation device.

12. The method of claim 1, further comprising:
determining a missing enhanced media content that has not been received from the at least one device according to the first scheduled start time associated with the first enhancement event.

13. The method of claim 8, further comprising:
converting the enhanced media content from a quadrature amplitude modulation (QAM) format to a format for transmission over an Internet Protocol (IP) network.

14. The method of claim 8, wherein the enhanced media content is received by the one or more computing devices at a time of reception, the method further comprising:
comparing the time of reception with a scheduled time of reception associated with the enhanced media content.

15. The method of claim 1, wherein the enhancement event is associated with second enhanced media content delivered via the content delivery network, the method further comprising:
receiving, by the one or more computing devices, a time of reception of the second enhanced media content; and
generating, by the one or more computing devices, a second report comprising a duration associated with the enhanced media content, wherein the duration comprises an interval between the time of reception of the second enhanced media content and a time of reception of the enhanced media content.

16. The method of claim 1, further comprising:
tracking, by the one or more computing devices, the enhancement event at different distribution portions of the content delivery network based on extracting one or more application signals associated with the enhanced media content.

17. The method of claim 8, further comprising:
tracking, by the one or more computing devices, the enhancement event at different distribution portions of the content delivery network based on extracting one or more application signals associated with the enhanced media content.

18. The method of claim 1, wherein the plurality of devices comprise one or more of a multiplexer, an aggregated multiplexer, an ad splicer, or an edge modulation device.

19. The method of claim 1, wherein the enhancement event comprises enhanced television (ETV) applications.

20. The method of claim 1, wherein the enhanced media content comprises at least one of an ETV integrated signaling stream (EISS), or a digital storage media command and control (DSM-CC) data carousel.

21. The method of claim 1, wherein each distribution portion of the content delivery network corresponds to a physical or logical location of the content delivery network.

* * * * *

UNITED STATES PATENT AND TRADEMARK OFFICE
CERTIFICATE OF CORRECTION

PATENT NO. : 10,771,827 B2
APPLICATION NO. : 13/114729
DATED : September 8, 2020
INVENTOR(S) : Van Doorn et al.

It is certified that error appears in the above-identified patent and that said Letters Patent is hereby corrected as shown below:

In the Specification

Detailed Description, Column 4, Line 30:
Delete "101" and insert --110--

Detailed Description, Column 8, Line 2:
Delete "datacarousel" and insert --data_carousel--

In the Claims

Claim 3, Column 11, Line 35:
After "the", delete "first"

Claim 11, Column 12, Line 42:
Delete "claim 9," and insert --claim 8,--

Claim 12, Column 12, Line 48:
After "to the", delete "first"

Claim 12, Column 12, Line 49:
Before "enhancement", delete "first"

Signed and Sealed this
Thirteenth Day of December, 2022

Katherine Kelly Vidal
*Director of the United States Patent and Trademark Office*